United States Patent [19]

Meier et al.

[11] 4,065,788

[45] Dec. 27, 1977

[54] REALTIME IMAGE PROCESSOR

[75] Inventors: Michael J. Meier, Monrovia; Edward C. Adams, La Palma; Richard W. Lindberg, Garden Grove, all of Calif.

[73] Assignee: McDonnell Douglas Corporation, Long Beach, Calif.

[21] Appl. No.: 656,413

[22] Filed: Feb. 9, 1976

[51] Int. Cl.² .............................................. H04H 5/38
[52] U.S. Cl. ...................................... 358/166; 358/96; 358/213
[58] Field of Search ........................... 178/DIG. 34, 6; 358/157, 213, 221, 96, 166, 217, 95

[56] References Cited
U.S. PATENT DOCUMENTS

3,465,094  9/1969  Biernson .............................. 358/217
3,908,082  9/1975  Pownall ............................... 358/217

Primary Examiner—Robert L. Griffin
Assistant Examiner—Edward L. Coles
Attorney, Agent, or Firm—Kleinberg, Morganstern, Scholnick & Mann

[57] ABSTRACT

An image formed on an array of photosensitive elements is scanned and stored. A defocussed image is scanned and subtracted from the stored signals. The frame-to-frame subtractive algorithm permits simultaneous image enhancement and elimination of sensor induced noise. Required storage capacity is reduced by separately storing the high frequency information-bearing components and the low frequency components of the video.

22 Claims, 14 Drawing Figures

REALTIME IMAGE PROCESSOR

BACKGROUND OF THE INVENTION

Field of the Invention

The present invention is in the field of image processing and particularly relates to apparatus for a real time enhancement of video signals through the use of a subtractive algorithm.

The Prior Art

The dramatic advances that have been made in recent years in charge-coupled storage devices have provided a way of solving the requirement for real time image processing apparatus for use with charge-coupled photodiode arrays. At present, two dimensional charge-coupled photodiode arrays having several hundred elements in each dimension are known in the art. Upon exposure to radiant energy, each element of the array generates and retains a quantum of electrical charge. When the exposure interval has been completed, the charge packets are read out of the array by shift registers, which are interdigitated in the photosensor array and operatively coupled to the photosensors.

In one well known embodiment, the sensor elements are read out serially in a predetermined sequence to form a video signal. Frame rates of 30 per second, which are desirable for television applications, can be achieved.

It is highly desirable to be able to process such video signals on a real time basis. The object of such processing is to improve the quality of the image by performing certain mathematical operations on the video signal. Obviously, such image processors must be capable of handling the large volume and high rate of the data produced.

Certain types of processing, such as simple filtering of the video signal are, of course, possible, but such simple process operations have only a limited degree of usefulness. Their limitations will be discussed below.

A highly useful family of image processing operations can be performed if the processor has a storage capability large enough to permit the entire video signature from a given frame to be either stored or delayed for comparison with the video signature produced in a later frame. Typical of such image processing applications is the full-frame moving target indicator described in a paper entitled, "Signal Processing Capabilities of a 100 × 100 CCD Array," published by Buchanan and Clark, in the Proceedings of the 1975 International Conference on the Application of Charge-Coupled Devices, at the Naval Electronic Laboratory Center (NELC), San Diego, California, Oct. 29–31, 1975. Many sophisticated signal processing techniques for use with charge-coupled devices therefore require the availability of circuits for the temporary storage or other delay of the video signal.

It might be expected that modern, high speed, general purpose computers would be able to perform the desired processing operations in a digital context. While it is true that such computers do have sufficient memory capability to perform the desired operations, it has been pointed out in a paper by Hunt and Trussell on "Recent Data on Image Enhancement Programs" in the Proceedings of the IEEE, Apr. 1973, Page 166, that the time required to process a frame of data is on the order of seconds. Hence, the operations of general purpose computers are not sufficiently fast to permit image processing on a real time basis for television-type applications.

At present, the preferred technique for storage and/or delay of such signals appears to be use of a charge-coupled shift register, as will be described below. A delay unit constructed of charge-coupled shift registers is used in a preferred embodiment of the present invention.

The present invention makes use of an image processing technique employing frame-to-frame differencing. This type of image processing algorithm and its application to charge-coupled diode arrays is foreshadowed in a co-pending application, "Detector Array Fixed Pattern Noise Compensation," Ser. No. 445,802, filed Feb. 25, 1974 by Richard M. Malueg, now U.S. Pat. No. 3,949,162 and assigned to the assignee of the present invention. In that invention, the fixed pattern noise inherent in the combination of the array and the switching means was compensated by first operating the switching means to scan the array through one frame while measuring the output signal derived from each element with all the elements maintained in a dark condition. The noise signals thus sampled were converted to digital form and stored in a fixed pattern of digital memory means.

During normal operation an image was produced on the array and the array was scanned in the fixed pattern. The digital noise signal for each detector was read from the memory, converted to analog form and subtracted from the output then being derived from the same detector. It will be noted, however, that in that invention, it was necessary to convert the noise outputs to a digital form and to store them in a digital form. By contrast, in the present invention the signals are stored in analog form.

SUMMARY OF THE INVENTION

During a first scan, a sensor scans an image focused thereon and generates an output signal in response to variations in the brightness of the image. Thereafter, the image is defocused to some degree and the sensor is again scanned, generating on the second scan an output signal responsive to the lower spatial frequencies that were present in the image.

The output signal generated in the first scan is delayed and the output signal generated in the second scan is coherently subtracted from it. In the resulting difference signal, the high frequency spatial components have been enhanced and the low frequency components are subtracted out.

Delay storage requirements are minimized by subtracted a constant signal from the sensor output and storing only the variations in signal level about the constant level. The combination of the above-described image enhancement and storage reduction techniques makes practical enhancement of television-type images on a real time basis, a result unobtainable hitherto.

The apparatus and technique disclosed herein are applicable to a wide variety of sensor types, including arrays of charge-coupled photodiodes and television cameras.

Because the output signals generated in the first, in-focus, scan and in the second, defocused, scan are subtracted, the process and apparatus of the present invention successfully removes sensor-induced spurious signals such as additive dark noise, responsivity variation induced multiplicative noise, and switching noise from the processed image, as well as removing the low spatial frequency components of the image.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 5, including

FIG. 6, including FIG. 7, including

DESCRIPTION OF THE PREFERRED EMBODIMENT

It is common knowledge that when an image is slightly defocused, the "fine structure" contained in the image is destroyed. As an image is gradually defocused from an initial, in-focus condition, at first the deterioration will scarcely be noticeable. Small objects, such as points and lines, appear to be slightly blurred or fuzzy.

With further defocusing, the deterioration begins to become noticeable in larger objects such as surfaces. The smaller objects are lost altogether. With still further defocusing, even the large objects appear only as ill-defined areas and gradations of brightness. Finally, when the image has been totally defocused, the image plane exhibits only a uniform intensity and no variations can be discerned.

Experience thus indicates that as an image is defocused, the higher spatial frequency components of the image are affected first and are deteriorated more severely than are the lower frequency components of the image. As defocusing continues, the high frequency components are lost altogether and only the low frequency components remain. When the image is completely defocused, only the steady state, or d.c. component of the image remains.

Unfortunately, by far the larger portion of the information contained in an image is carried by the higher spatial frequency components. Simply put, the detail of the image is in the high frequency component. The shading of extended objects corresponds to the mid-frequency range components. The overall tone or brightness of the picture is related mainly to the very low frequency components and the steady state value.

When a scene is viewed through a haze or fog, it may be that the details of the scene can scarcely be discerned. The fault is not lack of illumination, but, rather the fact that relative to the brightness of the fog or haze, the brightness variations of the scene are small. The high frequency components representing the information about the scene are dwarfed by the magnitude of the low frequency components presented by the fog or haze.

In such a situation, it would appear desirable to find a way of suppressing the lower frequency components relative to the high frequency components, and, if possible, amplifying the high frequency components. By such a process, the information present in the image can be enhanced, relative to the unwanted haze. It is precisely this problem to which the present invention is addressed.

Suppose, by way of example, that a sensor is viewing an object through a bright haze. The sensor is assumed to comprise an array of detectors, each of such small dimension as to be covered by an infinitesimal element of the image. Let $G_i$ denote the gain or responsivity of the $i^{th}$ element in the array, and further assume that each element in the array generates an additive dark signal $D_i$.

Because of manufacturing tolerances, the elements of the array have different responsivities $$G_i = 1 + \Delta G_i \tag{1}$$

Let H represent the uniform brightness of the haze and let $A_i$ represent the brightness variation attributable to the part of the object imaged on element $i$. Then the response of the $i^{th}$ element of the array is $$\text{Focused Response} = (H + A_i) G_i + D_i \tag{2}$$

$$\text{Focused Response} = (H = A_i)(1 + \Delta G_i) + D_i \tag{3}$$

If now the image is defocused, the brightness variation attributable to the part of the object imaged on element i becomes zero and $$\text{Defocused Response} = (H)(1 + \Delta G_i) + D_i \tag{4}$$

Thus, $$\text{Focused Response} - \text{Defocused Response} = A_i(1 + \Delta G_i) \tag{5}$$

A practical value of $\Delta G_i$ at the current state of the art is approximately 0.1. Thus, the difference between the focused response and the unfocused response is approximately equal to the brightness variation attributable to the part of the object imaged on element $i$. It is, of course, these brightness variations of the object which contain the information relating to the object, and which it is desired to determine.

This analysis suggested the principle of the present invention. The response of each element of the sensor is read-out with the image in focus. These signals are preserved. Thereafter, the response of each element is read out with the image defocused. The latter readings are subtracted from the former to leave a difference which closely approximates the brightness variations of the object. These variations may then be amplified, either electronically or by subsequent printing on high-contrast printing paper or film (emulsion).

From the above analysis, it can also be seen that the additive dark response of the sensor has been removed by the subtraction process. Thus, the present invention should automatically compensate each element of the sensor for its dark response and for any switching noise that may be associated with that element.

Interesting effects can be produced, depending upon the degree of defocusing employed. When no defocusing is used, the focused response obtained by a first scan or interrogation is compared with the response obtained on a second scan or interrogation. A difference will exist only if the object has moved in the interim. Thus, if no defocusing is used, the sensor operates as a moving target indicator.

At the other extreme, if the degree of defocusing is total, the sensor will remove all of the steady state background having zero spatial frequency. At some intermediate degree of defocusing, the sensor will remove the local background while spatially enhancing the scene. Regardless of the degree of focusing, the apparatus of the present invention always removes the additive dark noise contributed by each element of the array.

In the following paragraphs, it will be understood that it is immaterial whether the sensor comprises a number of elements arrayed across the image and read out in serial or comprises a single detecting element which is scanned across an image. The present invention further includes an array of devices, such as those to be described to enable coverage in an additional dimension or for use in multiplexing to provide enhanced performance.

Figure 1:
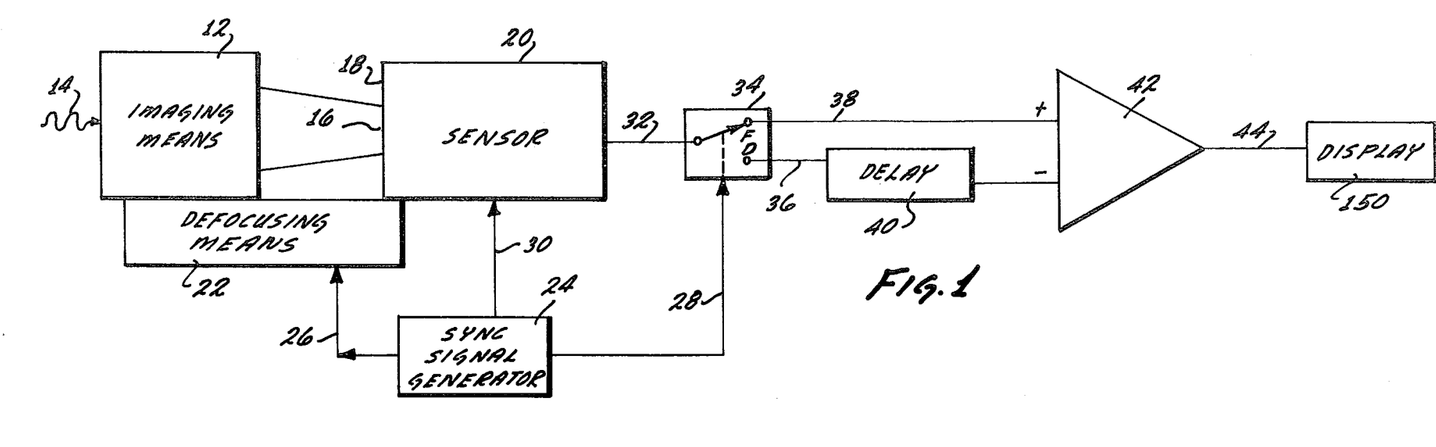
FIG. 1 is a block diagram of a simplified embodiment of the image processor of the present invention.

Referring now to the simplified embodiment of FIG. 1, imaging means 12 focuses the incoming radiation 14 to form an image 16. When in the focused condition, the image 16 lies on the photosensitive surface 18 of a sensor 20. Defocusing means 22 are normally disposed between imaging means 12 and the sensor 20. Imaging means 12 may comprise a lens, mirror, or combination thereof. Defocusing means 22 may comprise any of the devices shown in FIG. 5, as well as the simple expedient of varying the separation between imaging means 12 and sensor 20 along the optical axis.

Defocusing means 22 responds to a signal generated in a synchronizing signal generator 24 for effecting the desired condition of focus. A first conductor 26 connects the synchronizing signal generator to the defocusing means 22.

In the example of FIG. 1, the initial scan or exposure is made with the apparatus in the defocused condition. A second conductor 28 applies signals from the synchronizing signal generator 24 to a switch 34 which steers switch 34 to a "lower" position in response to a signal. A signal generated by sensor 20 is d.c. coupled through a conductor 32 through the switch 34 to a delay 40. Delay 40 may include an analog memory or a digital memory with A/D and D/A converters.

At the end of the read out phase or scan, sync signal generator 24 actuates defocusing means 22 to bring image 16 into focus on the photosensitive surface 18. Sync signal generator 24 then further actuates switch 34, so that the in-focus signals on conductor 32 are combined in a summing amplifier 42 with the delayed signals applied by the delay 40.

The output of summing amplifier 42 is a signal representing the focused response minus the defocused response. The output of summing amplifier 42 is then converted to a visible image by display 150. Sync signal generator 24 further generates a signal on conductor 30 to initiate the scanning action of sensor 20. The delay introduced by delay unit 40 should, of course, be exactly equal to one scan period.

Although the simple embodiment of FIG. 1 is useful for explaining the invention, it is not particularly efficient because an output signal is provided to the display 150 only during alternate scans. To avoid this inefficiency, the embodiment shown in FIG. 2 has been provided with an alternative sequence of operation.

Figure 2:
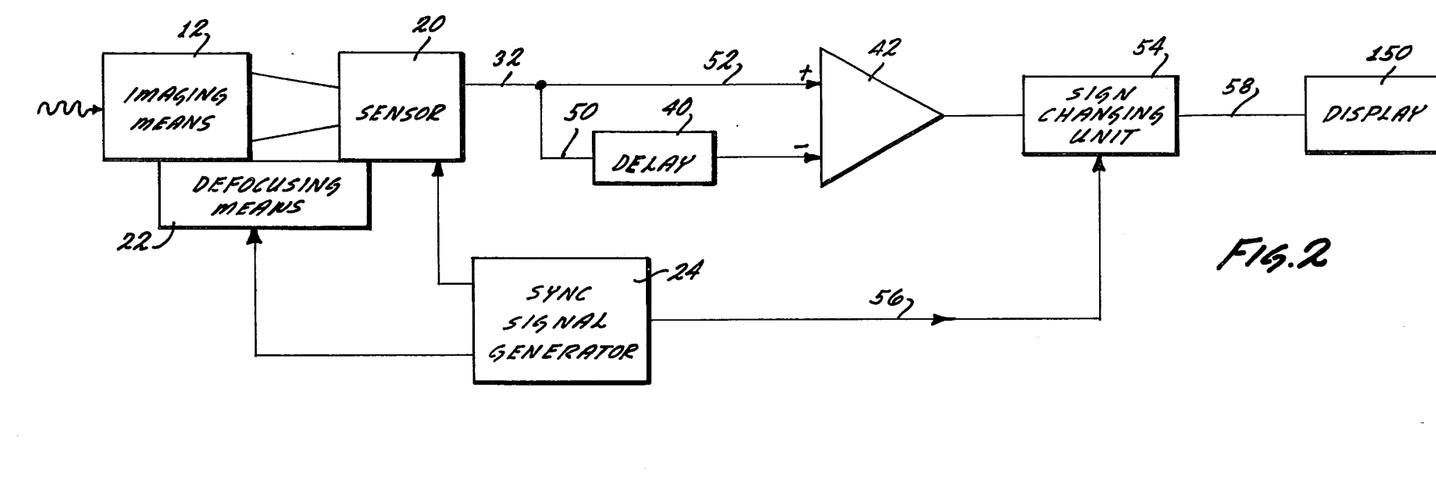
FIG. 2 is a block diagram of an alternative simplified embodiment of the image processor of the present invention.

Turning next to FIG. 2, the apparatus of FIG. 1 is modified to eliminate the switch 34. The output of sensor 20 on conductor 32 is then fed to summing amplifier 42 and is simultaneously fed to the delay 40. Thus, unlike FIG. 1, the signal in delay 40 is always the signal from the immediately preceding scan, rather than the immediately preceding defocused scan. Thus, on successive scans, the signal from the sensor 20 to the amplifier 42 will alternately be the focused response or the defocused response. As a result, the output of summing amplifier 42 will alternate on successive scans between a "correct" sign or an "incorrect" sign.

This difficulty is solved by interposing a sign changing unit 54, selectively between the amplifier 42 and the display 150. The sign changing unit 54 is selectively operated by a signal from sync signal generator 24 to reverse the sign during alternate cycles.

In this way, the output signal to the display 150 always represents the focused response minus the defocused response. Further, an output signal is produced for each scan of sensor 20 and is made visible by the display 150.

It can be readily appreciated that if sensor 20 is a two-dimensional detector array having 380 × 488 elements, corresponding to a standard television raster, then each scan will result in some 185,000 "words" of information from all of the elements. If each element generates a "word" of 12 bits to indicate the brightness level, and if the frame rate is 30 per second, then delay unit 40 must be able to store over 2.2 million bits of information and reproduce them, repeating this process 30 times per second.

Obviously, this presents a formidable data processing problem which must be surmounted if real time image processing of television pictures is to become a reality. In an article entitled, "Recent Data on Image Enhancement Programs" published in the *Proceedings of the IEEE* of April, 1973, at page 166, Hunt and Trussell showed that programs for enhancing a 1024 × 1024 matrix through the use of a powerful high speed computer requires 45 seconds to complete each frame. This would be much too slow for real time image processing operations.

The present invention solves this problem by combining the algorithm described above with a data storage reduction technique to be described below to achieve a system that can be implemented with presently available hardward thereby enabling the real time image processing of television-type signals.

The data storage reduction technique employed with the present invention is based on the recognition that the sensor output corresponding to the spatial harmonic characteristics of the image, includes a relatively low amplitude, high frequency information bearing component which is superimposed on a generally large amplitude, low frequency component. Because of the magnitude of the low frequency component, a large number of binary bits are required to represent its magnitude above the d.c. level. On the other hand, the high frequency component of the signal is of relatively small amplitude. Therefore a correspondingly small number of binary bits is required to represent it digitally.

For example, if a 12 bit binary number is required to represent the signal digitally, then the seven, most significant digits could represent the low frequency component while only the five least significant digits could represent the high frequency, information-bearing components. Obviously, a very significant reduction in data storage requirements could be achieved if only that portion of the signal corresponding to the high frequency components need be stored and retrieved.

Figure 3:
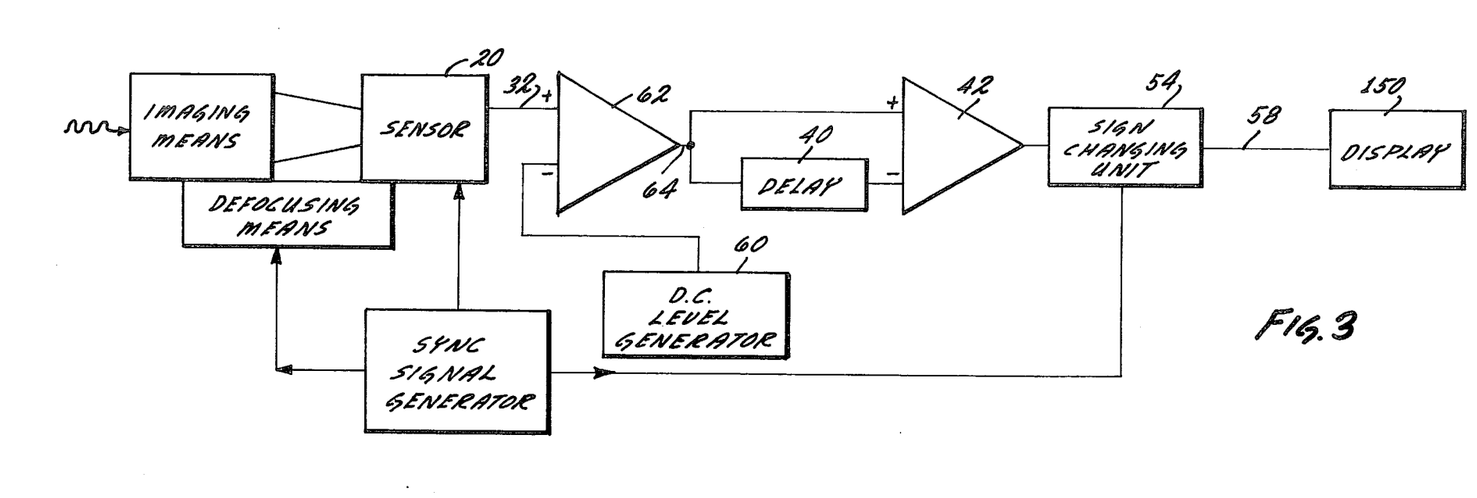
FIG. 3 is a block diagram of another alternative embodiment of the image processor of the present invention.

The data storage reduction technique of the present invention is illustrated in FIG. 3. The combination of FIG. 2 is modified by the interposition of a second summing amplifier 62 between the output of sensor 20 and the delay 40 and summing amplifier 42. A fixed d.c. signal is generated by d.c. level generator 60 and is fed into the second summing amplifier 62 with a polarity opposite that of the sensor 20 output.

Thus, in the second summing amplifier 62, the d.c. component of the signal is stripped away and only the fluctuating portion is fed to the delay unit 40. Because the same d.c. level is subtracted during both the focused and the defocused scans, the d.c. level chosen does not alter the output signal applied to the display 150.

In fact, if the d.c. level were chosen as zero, then the embodiment of FIG. 3 would be essentially equivalent to that shown in FIG. 2. This does not, however, mean that the choice of d.c. level is unimportant. There is a well known theorem of statistics to the effect that the mean squared deviation is minimized when calculated about the mean value. This is relevant to the embodiment of FIG. 3 in that if the d.c. level chosen equals the average value of the sensor output, the r.m.s. magnitude of the signal output of the second summing amplifier 62 will be a minimum and hence the data storage requirements will also be minimized.

Figure 4:
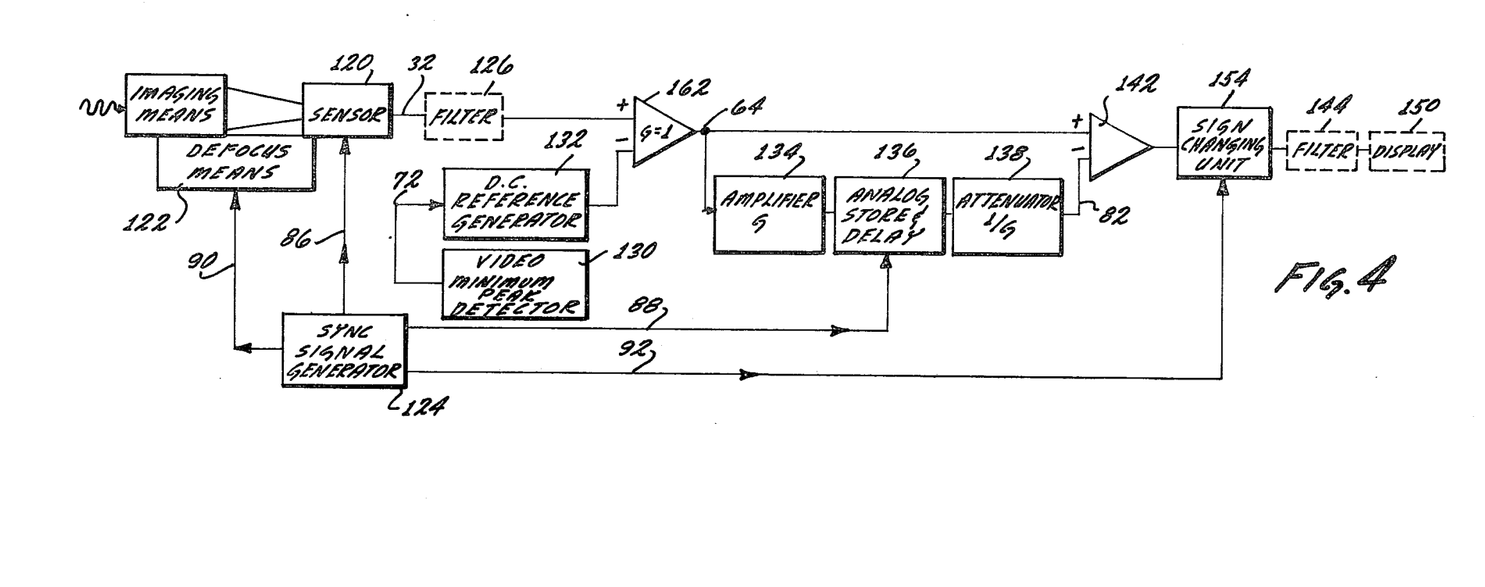
FIG. 4 is a block diagram of a preferred embodiment of the image processor of the present invention.

The data storage reduction technique of the present invention is somewhat analogous to the technique of single sideband radio transmission. FIG. 4 shows a block diagram of a preferred embodiment of the present invention. As in FIG. 3, the data storage reduction technique has been combined with the image-processing algorithm. Although the embodiment shown in FIG. 3 works adequately in many applications, it is recognized that applications exist in which it is not feasible to predetermine the optimum d.c. level.

Further, to the extent that the d.c. level is poorly chosen, the signal output of the second summing amplifier may be unduly large. If only a limited number of binary digits are available to represent the data, the most significant digits will be taken over by the low frequency components, thereby providing the higher frequency components of their share of the available digits. As a result, the accuracy of the system would be impared.

To avoid this problem, which arises due to the inability to select an appropriate d.c. level in advance, the circuit of FIG. 4 employs means for selecting a d.c. level in response to the output of sensor. Thus, the embodiment of FIG. 4 is preferred because it is adaptive.

Turning next to the embodiment of FIG. 4, the output of sensor 120 may be filtered by optional filter 126 shown in dashed lines. The function of optional filter 126 will be explained below. The output of sensor 120, whether filtered or not, is continually sensed by a video minimum peak detector 130 which provides a signal to a d.c. reference generator 132. The d.c. reference signal generated by generator 132 is used in place of the predetermined d.c. level used in the embodiment of FIG. 3.

The video minimum peak detector 130 determines from the video signal output of sensor 120, the minimum value of the video signal. The d.c. signal level set by d.c. reference generator 132 is set equal to the minimum value of the video signal or slightly less than it. In one embodiment, the video minimum peak detector 130 operates on a sample-hold-replace principle, in which the value currently being held is continually being replaced by subsequently occurring video signal levels less than the then-stored level. Such a circuit requires a minimal start up time, but thereafter functions effectively to permit the d.c. level to adapt to changes in the video signal from sensor 120.

In the preferred embodiment shown in FIG. 4, sensor 120 is a two-dimensional charge-coupled diode photosensitive array. The elements of this array are arranged in rows and columns and by an internally clocked shift register arrangement, the charge stored by each of the elements in response to the impinging radiation is clocked out, one element at a time, across successive rows. Thus, if the sensor array 120 is composed of N rows by M columns of photosensitive elements, the video signal output for each frame will consist of a succession of $N \times M$ signal levels. This stream of video data, after adjustment of its d.c. level in summing amplifier 162 and after amplification in an amplifier 134 is stored in an analog storage and delay unit 136.

Analog storage and delay unit 136, in this preferred embodiment, comprises N vertical analog shift registers, each M stages in length. The segments of the video signal corresponding to the rows of a single frame are clocked into a single horizontal shift register M units in length and then transferred in parallel to the first elements of the vertical shift registers.

When all the segments of the video signal corresponding to the rows of the array have been clocked into the vertical shift registers, the contents of the last stages of each of the vertical shift registers are transferred, again in parallel, to a second horizontal shift register for readout. Thus, analog store and delay 136 is said to operate in a series-parallel-series mode.

Such an arrangement of shift registers is similar to that used in reading out the charges generated by the photosensitive element of sensor 120, originally. Thus, it is not surprising that the state of the art of the analog storage and delay device 136 will keep pace with that of the charge-coupled diode photosensors.

After the delayed signal has been read out of analog store and delay unit 136, it is attenuated by attenuator 138 to render it compatible with the output of summing amplifier 162. Thereafter, the delayed signal from attenuator 138 is subtracted from the signal output of the summing amplifier 162 in summing amplifier 142 and the sign of the difference is correct in a sign changing unit 154. The output of sign changing unit 154 may be filtered by optional second filter 144, shown in dashed lines in FIG. 4, before being converted to a visible image by display 150.

The sequence of operation of the various elements of the preferred embodiment of FIG. 4 is controlled by a sync signal generator 124. That unit generates a number of control signals at appropriate times. Typically, sync signal generator 124 comprises a clock and count-down circuits for preserving the precise temporal interrelationships of the various control signals generated. Thus, sync signal generator 124, in the preferred embodiment, generates clocking signals for reading out the video signals from sensor 120 and for storing it in analog storage and delay circuit 136 through appropriate conductors.

At the end of each frame, sync signal generator 124 applies a signal to sign changing unit 154 to provide the necessary alteration of the sign of the output of summing amplifier 142. Further, sync signal generator 124 applies a driving signal to defocus means 122 to alter the degree of defocus on successive frames or scans.

Thus, there has been described a preferred embodiment in FIG. 4, in which a two-dimensional photodiode array senses, in successive frames, an image which is alternately in focus and defocused. An output is generated by frame-to-frame subtraction and the image represented by the output is enhanced by the suppression of low frequency spatial components and of active, detector-contributed noise. A charge-coupled analog storage and delay unit is employed to delay an entire frame of data.

FIG. 5, including FIGS. 5(a) through 5(d), is a series of diagrams showing several alternative optical defocusing devices. Although the frequency of defocusing would normally equal half the frame rate of the sensor, e.g. 30 frames per second, higher or lower defocusing rates are within the scope of the present invention. Defocusing techniques using rotating discs or elements are not unreasonable for use at 30 frames per second.

Figure 5A:
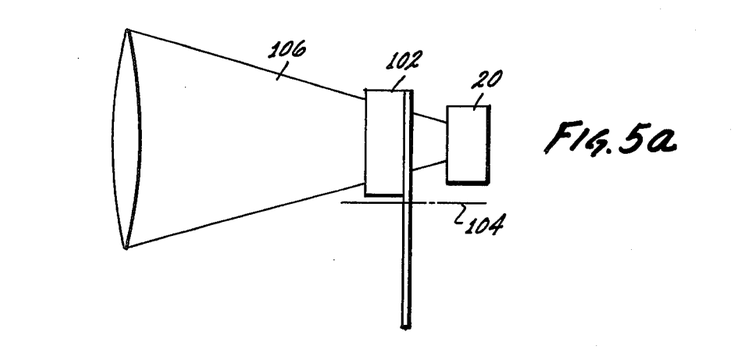
FIGS. 5(a) through 5(d), are diagrams illustrating techniques for defocusing an image.
Figure 5B:
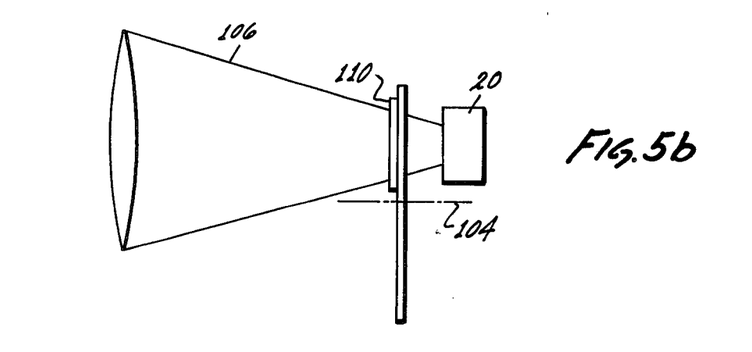

It is well known that the focal plane of an imaging system can be displaced by interposing a parallel transparent plate in the optical path between the imaging system and the image. FIG. 5(a) shows the use of this principle, whereby a semi-circular plate 102 is rotated about an axis 104 so that it alternately passes through a bundle 106 of rays that combine to form an image on sensor 20 when the semi-circular plate is not in the ray bundle 106. Likewise, in FIG. 5(b), a diffusing screen 110 is rotated about axis 104 to alternatively interrupt the ray bundle 106.

Figure 5C:
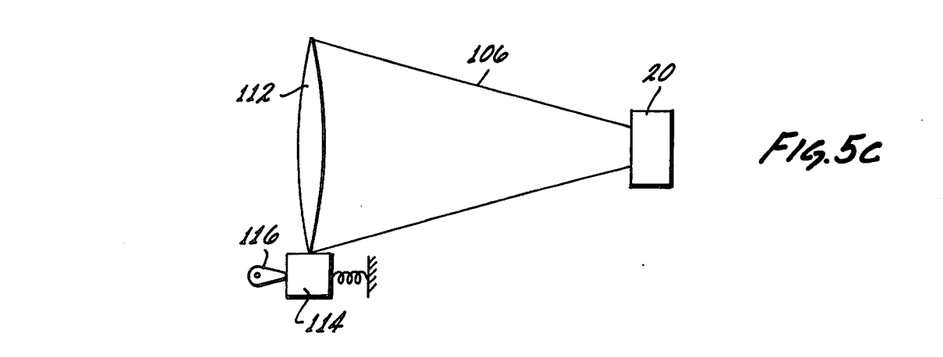

In FIG. 5(c), an image-forming device 112 is mounted on a fixture 114 which is translated in a reciprocating motion in a direction parallel to the optical axis by the rotation of a cam 116. The image formed by element 112 likewise is translated an equal distance along the optical axis.

Figure 5D:
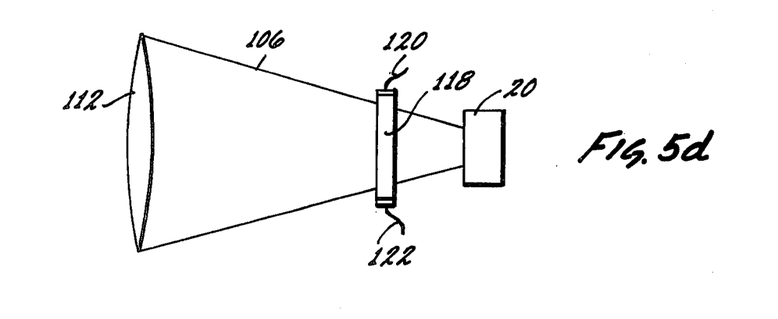

If it appears preferable to introduce the defocusing without using moving parts, the embodiment of FIG. 5(d) should provide useful. In that embodiment, a dynamic scattering liquid crystal plate 118 is interposed in the ray bundle 106 to produce a diffusion of the image in response to periodic electrical signals applied to it on conductors 120 and 122. In this embodiment, the degree of defocusing produced is electrically controlled.

FIGS. 6 and 7 are graphs of signal amplitude vs. spatial frequency which compare the results obtainable with the present invention against the results that can be achieved using prior art techniques. FIG. 6 illustrates the results of the prior art technique.

Figure 6A:
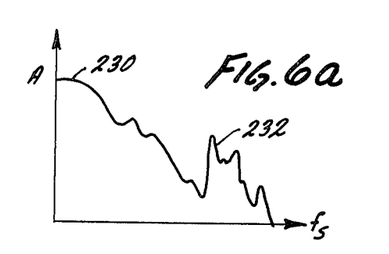
FIGS. 6(a) through 6(c) are graphs illustrating the results obtained with prior art image processor systems.

In FIG. 6(a), there is shown the frequency spectrum of a video signal generated as a sensor scans an image. From this frequency spectrum it can be seen that the video signal contains a large amount of relatively low frequency components 230, as well as sensor-introduced noise 232 at a higher frequency. The sensor-induced noise 232 includes sensor "dark" noise and responsivity variation induced noise as well as switching noise which results when the elements of the sensor array are clocked out.

The video signal whose frequency transform is shown in FIG. 6(a) is normally subjected to electrical filtering to alter its spectral composition in a predetermined desired manner. In the image processors of the prior art, typically the signal would be passed through a filter having a transfer function 234 such as that shown in FIG. 6(b). The filter is a high pass filter designed to attenuate the lower frequency components 230 while retaining or emphasizing the higher frequency information-bearing components 232.

Figure 6B:
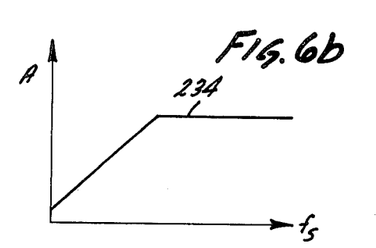

The spectral composition of the output of the filter is found by multiplying, at each frequency, the amplitude given in the graph of FIG. 6(a) by the gain at the same frequency, as given by the graph of FIG. 6(b). Hence, the prior art typically makes use of a multiplicative algorithm.

Figure 6C:
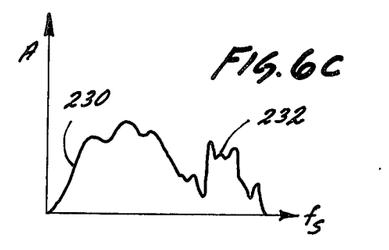

In FIG. 6(c), there is shown the spectrum of the output of the high pass filter. It will be seen that the low frequency components 230 have been suppressed by the filter but that the high frequency sensor-induced noise components 232 are still present in the signal. If the image processing filters were designed to attenuate these high frequency noise components 232, the filter would necessarily also attenuate a substantial portion of the information present in the signal. This dilemma is one of the principal limitations of the prior art image processing techniques. As will be seen below, this limitation can be eliminated by the use of the image processing algorithm of the present invention.

Figure 7A:
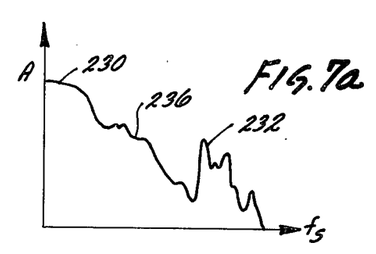
FIGS. 7(a) through 7(c) are graphs illustrating the results obtained with the image processor of the present invention.

FIG. 7(a) is a comparable graph of the spectral characteristic of a video signal produced as the sensor of the present invention scans a sharply focused image. To facilitate the comparison, the graph of FIG. 7(a) is assumed to be identical to that of FIG. 6(a).

Figure 7B:
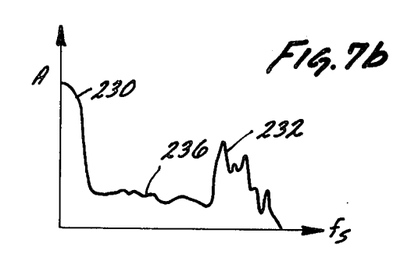

The graph of FIG. 7(b) shows the spectral composition of the video signal produced as the sensor of the present invention scans a defocused image. As described above, defocusing the image destroys the higher frequency components and attenuates the intermediate frequency components 236, while passing the low frequency components 230. However, the high frequency sensor-induced components 232 are still present because they are not affected by the degree of defocusing.

As disclosed above, the image processor of the present invention employs a subtractive algorithm in contrast to the multiplicative algorithm used by prior art image processors. In the present invention, the video signal produced when a defocused image is scanned is subtracted from the video signal produced when the focused image is scanned. Because the two signals are subtracted, their spectrums shown in FIG. 7(a) and FIG. 7(b) can be subtracted to obtain the spectrum of the difference, which is shown in FIG. 7(c).

Figure 7C:
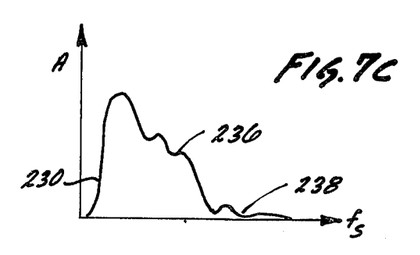

It can be seen, from FIG. 7(c) that the low frequency components 230 have been greatly reduced, the mid-frequency components 236 have been passed and the sensor induced components 232 have been eliminated, revealing the true value 238 of the higher frequency components. Thus, the image processor of the present invention accomplishes all the beneficial results of the prior art image processor while at the same time achieving an additional important result, namely the elimination of sensor induced noise.

It is possible to incorporate into the present invention the signal processing filters used in the prior art. As shown in dashed lines in FIG. 4, optional filter 126 could be inserted in series after sensor 120 to enhance the image or to condition the signal for subsequent signal processing operations. Likewise, optional filter 144 could be inserted in series after sign changing unit 154.

It is noteworthy that the present invention permits the subtractive algorithm to be used for realtime image processing, such as might be used in connection with television signals. Prior art systems using the subtractive algorithm have proven to be too slow to permit realtime operation, even when high speed general purpose computers having large memories were employed. Thus, in the present invention the use of a subtractive algorithm is facilitated by the provision of a more efficient data handling and storage technique, namely the stripping of the information-bearing, high frequency components, delaying the high frequency components, and, in effect, recombining the high and low frequency components, after the delay period.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. For use in a system in which a photosensor repeatedly produces electrical signals embodying an image in response to applied gating signals, apparatus for enhancing the image, comprising:
   a. optical means for forming an image on the photosensor and operable to periodically defocus the image in response to an applied defocusing signal;
   b. storage means, connected to the photosensor, for generating a reproduction of the electrical signals produced by the photosensor delayed by a predetermined amount; and
   c. differencing means connected to said storage means and to the sensor for producing an output difference signal representing the difference between the delayed and undelayed electrical signals produced by the photosensor; whereby signals representing defocused image and signals representing a focused image are subtracted to produce an output signal.

2. The apparatus of claim 1 further comprising:
   inverting means connected to said differencing means for producing an output signal whose magnitude always equals the magnitude of the difference signal and whose sign is the same as that of the difference signal except when it is selectively reversed from that of the difference signal in response to an inverting signal applied when the photosensor is producing electrical signals in response to the defocused image; and
   sync signal generator connected to said optical means for applying to it a predetermined sequence of defocusing signals, connected to said inverting means for applying to it a predetermined sequence of inverting signals, and connected to the photosensor for applying to it a predetermined sequence of gating signals.

3. The apparatus of claim 2 further comprising display means connected to said inverting means and responsive to its output signal for generating an image therefrom.

4. The apparatus of claim 2 further comprising filtering means connected in the output path of said inverting means to modify the signals produced by it.

5. The apparatus of claim 2 wherein said storage means further comprise a digital memory.

6. The apparatus of claim 2 wherein said storage means further comprises an analog charge-coupled shift register or digital memory responsive to a predetermined sequence of applied gating signals to generate a delayed reproduction of the electrical signal produced by the photosensor, and wherein said sync signal generator is connected to said storage means for applying to it a predetermined sequence of gating signals.

7. The apparatus of claim 1 further comprising filtering means connected in the output path of the photosensor to modify the electrical signals produced by it.

8. The apparatus of claim 1 wherein said optical means further comprises a rotating optical component for periodically defocusing the image.

9. The apparatus of claim 1 wherein said optical means further comprises a dynamic scattering liquid crystal plate interposed in the optical path and selectively operable in response to the applied defocusing signal to defocus the image.

10. Apparatus for enhancing an image, for use in a system in which a photosensor repeatedly produces in response to applied gating signals electrical signals embodying the image, comprising:
    optical means for forming an image on the photosensor and for periodically defocusing the image in response to an applied defocusing signal;
    low frequency signal generator for generating as an output a signal whose median frequency is substantially less than the median frequency of the signals produced by the photosensor;
    first differencing means connected to the photosensor and to said low frequency signal generator for subtracting the output of said low frequency signal generator from the signals produced by the photosensor and for presenting the resulting reduced signal as an output;
    storage means connected to said first differencing means for generating a delayed reproduction of its output;
    second differencing means connected to said storage means and to the sensor for producing an output difference signal equal to the difference between the electrical signals produced by the photosensor and the delayed reproduction generated by said storage means;
    inverting means connected to the output of said differencing means for producing an output signal whose magnitude always equals the magnitude of the difference signal and whose sign is the same as that of the difference signal except when it is selectively reversed from that of the difference signal in response to an inverting signal applied when the photosensor is producing electrical signals in response to the defocused image; and
    sync signal generator connected to said optical means for applying to it a predetermined sequence of defocusing signals, connected to said inverting means for applying to it a predetermined sequence of inverting signals, and connected to the photosensor for applying to it a predetermined sequence of gating signals.

11. The apparatus of claim 10 wherein said low frequency signal generator is a source of direct current.

12. The apparatus of claim 10 wherein said low frequency signal generator is connected to the photosensor for generating a low frequency output signal responsive to the signals produced by the photosensor.

13. The apparatus of claim 12 wherein said low frequency signal generator further comprises a minimum peak detector connected to the photosensor for determining the minimum level of the signal produced by the photosensor, and a signal source connected to said minimum peak detector for generating an output equal to the minimum level determined.

14. The apparatus of claim 10 further comprising display means connected to said inverting means and responsive to its output signal for generating an image therefrom.

15. The apparatus of claim 10 further comprising filtering means connected in the output path of the photosensor to modify the electrical signals produced by it.

16. The apparatus of claim 10 further comprising filtering means connected in the output path of said inverting means to modify the signals produced by it.

17. The apparatus of claim 10 wherein said storage means further comprises an analog charge-coupled shift register responsive to a predetermined sequence of applied gating signals to generate a delayed reproduction of the electrical signal produced by the photosensor, and wherein said sync signal generator is connected to said storage means for applying to it a predetermined sequence of gating signals.

18. The apparatus of claim 10 wherein said optical means further comprises a rotating optical component for periodically defocusing the image.

19. The apparatus of claim 10 wherein said optical means further comprises a dynamic scattering liquid crystal plate interposed in the optical path and selectively operable in response to the applied defocusing signal to defocus the image.

20. A process for enhancing an image, for use in a system in which a photosensor repeatedly produces electrical signals embodying the image, comprising the steps of:
   a. focusing the image on the photosensor;
   b. converting the focused image to electrical signals;
   c. storing the electrical signals;
   d. defocusing the image on the photosensor;
   e. converting the defocused image to electrical signals;
   f. recalling from storage the stored electrical signals;
   g. subtracting the electrical signals embodying the defocused image from the electrical signals recalled from storage representing the focused image, to produce a difference signal; and
   h. converting the difference signal to an image by use of a display device.

21. A process for enhancing an image, for use in a system in which a photosensor repeatedly produces electrical signals embodying the image formed on it, comprising the steps of:
   a. focusing the image on the photosensor;
   b. converting the focused image to electrical signals produced by the photosensor;
   c. generating a low frequency signal;
   d. subtracting the low frequency signal from the electrical signals produced by the photosensor to produce reduced signals associated with the focused image;
   e. storing the reduced signals;
   f. defocusing the image on the photosensor;
   g. converting the defocused image to electrical signals produced by the photosensor;
   h. generating a low frequency signal;
   i. subtracting the low frequency signal from the electrical signals produced by the photosensor to produce reduced signals associated with the defocused image;
   j. subtracting the reduced signals associated with the defocused image from the reduced signals associated with the focused image to produce difference signals; and
   k. converting the difference signal to an image by use of a display device.

22. The process of claim 21 wherein steps a – d are interchanged with steps f – i, respectively.

* * * * *

UNITED STATES PATENT OFFICE
CERTIFICATE OF CORRECTION

Patent No. 4,065,788　　　　　　　　　Dated December 27, 1977

Inventor(s) Michael J. Meier, et al.

It is certified that error appears in the above-identified patent and that said Letters Patent are hereby corrected as shown below:

Column 2, lines 52 and 53, "subtracted" should be
-- subtracting --;
Column 7, line 54, "providing" should be -- depriving --.

Signed and Sealed this

Sixth Day of June 1978

[SEAL]

Attest:

RUTH C. MASON
*Attesting Officer*

DONALD W. BANNER
*Commissioner of Patents and Trademarks*